UNITED STATES PATENT OFFICE.

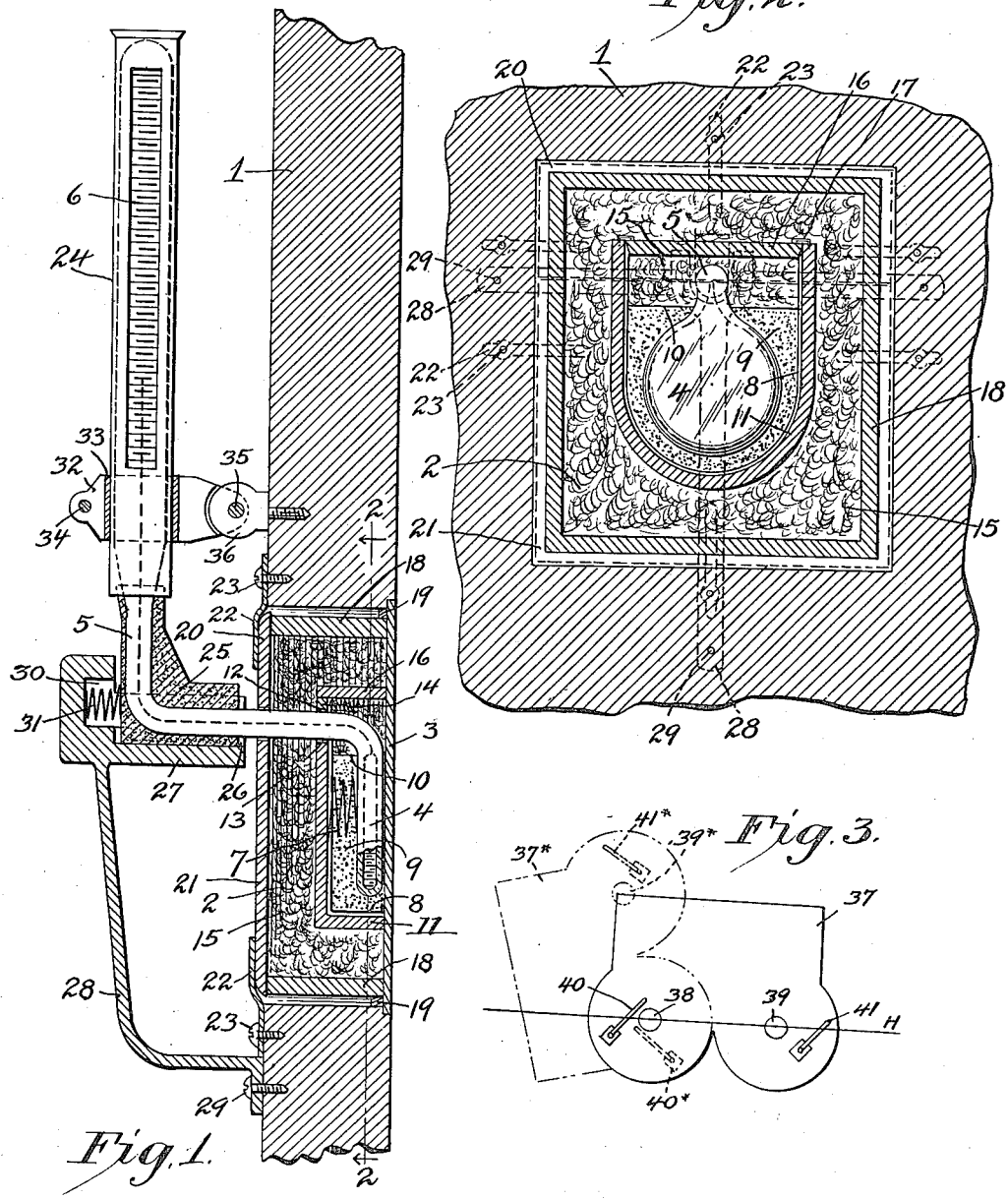

LOUIS CHARLES REESE, OF SAGINAW, MICHIGAN, ASSIGNOR TO WERNER & PFLEIDERER CO., INC., OF SAGINAW, MICHIGAN, A FIRM.

MEASURING THE TEMPERATURE IN MIXING-MACHINES AND THE LIKE.

1,294,165. Specification of Letters Patent. Patented Feb. 11, 1919.

Application filed October 19, 1918. Serial No. 258,919.

*To all whom it may concern:*

Be it known that I, LOUIS CHARLES REESE, a resident of Saginaw, in the county of Saginaw and State of Michigan, have invented new and useful Improvements in Measuring the Temperature in Mixing-Machines and the like, of which the following is a specification.

This invention relates to improvements in the construction and arrangement of thermometers used for mixing machines and the like, into the interior of which they are prevented from being inserted by the movement of the beaters, mixing and kneading blades, stirrers or similar devices employed therein, and has for its object to enable the attendant to ascertain the temperature of the contents of such machines instantaneously and accurately at any time without interrupting the operation and, by thus having the same under continuous control, to make the work more efficient and the results more secure.

For this purpose, I place a thermometer of a suitable shape in a cavity, recess or the like arranged in a suitable part of the wall of the trough or vessel in which the mixing or like operation takes place, and so formed that its thin bottom the exact position and thickness of which is determined according to the pressure against it caused by the operation, follows in outline and shape the inside surface of the vessel, envelop the enlarged thermometer bulb pressed with its flat side against the reduced metal wall with a mantle of a good heat conductor adapted to transmit with the utmost celerity the heat passing from the material within the mixing vessel through the thin metallic wall to the sides and back of the bulb, and surround then this mantle with a bad heat conductor so arranged as to insulate the same against the transmission of heat to or from the surrounding metallic walls of the vessel and the outer air.

The cavity for holding the device is produced in the trough walls which are usually made of cast iron, either by arranging it while it is cast, or by completely covering an opening left therein by a thin plate smoothly soldered, brazed, welded, riveted, bolted or affixed in any way to the rim of the opening so as to form a continuation of the shape of the inner surface of the solid wall of the vessel.

I preferably use, for a good heat conductor, powdered copper or brass, and, as a bad heat conductor, cotton wool. The casings holding these materials and the brackets carrying the thermometers are so constructed and arranged that the thermometer can be easily placed into and kept in its proper position, and, if necessary, replaced by another one. In many cases it has proved advantageous to press the bulb of the thermometer against the reduced wall of the vessel by elastic means.

When the mixing trough is emptied by being tilted, the thermometer is attached to the same in a position inclined opposite to the direction of the tilting, so that no mercury can escape from the bulb into the top part of the thermometer and thus prevent its working.

The accompanying drawings show, as example of the construction and arrangement of the device forming the object of the invention, a thermometer and its accessories used in a mixing and kneading machine.

Figure 1. represents a sectional elevation of the device.

Fig. 2. is a cross-section of the same on the line 2—2 of Fig. 1, showing at the same time in dotted lines the manner in which the casing for the non-conductor and the bracket carrying the thermometer are fixed to the wall of the vessel.

Fig. 3. shows the inclination toward the horizontal of the thermometer of the device arranged at a side wall of the trough of a double-blade mixing machine, when the latter is in its working position, and when it is tilted for being discharged. Identical numbers indicate identical parts in the various views of the drawings.

1 is the wall of the mixing trough, 2 the oblong cavity provided therein, and 3 the thin plate of metal covering it and separating it from the material under treatment in the machine.

4 designates the bulb, 5 the bent stem, and 6 the graduated, upright top-part of the thermometer.

The bulb 4 has the shape of a disk of small height and large diameter and is pressed with its flat side against the back of the plate 3 by means of the spring 7 attached to the back wall of the thin metallic casing 8 surrounding its other sides and the lower part of the stem 5 of the thermometer. The casing 8 is tightly soldered to the plate 3, filled with powdered copper 9 up to such a point—say the line 10—that it completely envelops the bulb 4, and incased in the closely fitting, wooden housing 11 fixed to the same by any suitable means. The casing 8 and the housing 11 are provided at the upper part of their back wall with corresponding slits, 12 and 13, adapted to receive the horizontal part of the stem 5 of the thermometer and filled out with a suitably shaped piece of wood 14, after the same has been put into its position. The upper part of the casing 8 above the line 10 and especially also the interstice between the stem 5 and the edge of the slits 12 and 13 are tightly filled out with a non-conductor, preferably cotton wool 15, which is held in position and compressed by the wooden lid 16, fixed to the top of the casing 11 by the hooks 17 in such a manner that not a trace of the metallic powder 9 contained therein can escape therefrom. The housing 11 and the lid 16 are completely surrounded with insulating material, preferably cotton wool 15, contained in the wooden box 18 the sides of which nearly touch the walls of the cavity 2 and are fixed therein by the small wooden wedges 19. The lid of the box 18 consists of the upper, smaller part 20 and the lower, larger part 21, each provided with a half-round incision correspondingly arranged to fit the stem of the thermometer, and is pressed against the top of the sides of the box and the insulating material contained therein by means of suitably arranged springs 22 turning around headed studs 23 screwed into the wall 1 of the machine.

The graduated, straight part 6 of the thermometer is inclosed in and thus protected by a closely fitting metal tube 24 having a wide slit for showing the scale.

The angle in the stem 5 connecting its horizontal part with the upright part 6 of the thermometer is embedded for its protection in a suitable cementitious material 25, for instance gypsum, contained in a rectangular channel 26 resting on the bracket 27 which serves thus as main support for the thermometer. The bracket 27 is fixed to the wall 1 by means of the three arms 28 and the set screws 29, and is provided at its back with a cylindrical, horizontal cavity, 30, serving as casing for the spring 31 which acting with its free end on the elbow 26, presses the thermometer against the plate 3.

At its lower end the tube 24 containing the scale of the thermometer is held in a clamp 32, india rubber packing 33 being inserted between the clamp and the tube. The clamp 32 consists of two parts, at one end connected by the screw bolt 34 and at the other elongated end rotatably held by the bolt 35 between the two leaves of the clasp 36 fixed to the wall 1 of the machine. In this way the thermometer, while securely fixed to the wall of the mixing trough has a small play—as far as the springs 7 and 31 allow—around the pivot 35 in the direction of the wall 3 of the cavity 2, and can be easily removed and replaced, when required by the conditions of the operation.

In Fig. 3, the mixing trough of the machine is designated by the number 37, when in its working position on the horizontal H—H, and by 37*, when completely tilted for being emptied.

38 and 39 are the shafts of the mixing blades for the trough 37; when the latter is turned around the shaft 38 as pivot into the position 37*, the shaft 39 has the corresponding position 39*. The thermometers 40 and 41, attached to the trough 37, are moved, when the latter is being tilted through the vertical to its opposite side into their corresponding positions 40* and 41*, whereby the mercury contained in the bulb is prevented from entering the upper empty part of the mercury tube of the thermometer.

It is obvious that the special shape, construction and arrangement of the thermometer and the other accessories of the device may be varied in a multitude of ways without leaving the general principle of the construction and arrangement of the device itself as a whole, and I therefore include all possible variations within the scope of my claims.

I claim:

1. In a machine of kind herein described, the combination with the vessel in which the operation takes place, having a cavity provided in its wall, the thin bottom of the cavity following in shape the inside surface of the said wall, of a thermometer so arranged in the said cavity that its bulb touches the bottom of the same over a large area, and so constructed that its scale connected with the bulb by a suitably bent stem, can be easily and correctly read at any time, a mantle of a good heat-conductor enveloping the said bulb and adapted to transmit to the same the heat passing from the interior of the said vessel through the bottom of the said cavity, and a mantle consisting of a non-conductor surrounding the last named mantle and adapted to insulate the same and the thermometer bulb therein from the effect of the temperature of the walls of the vessel and the outside air.

2. In a machine of the kind described, the combination with the vessel in which the operation takes place, having an opening provided in its wall, of a thin bottom-plate fixed to the edge of the said opening inside the vessel and shaped to form the bottom of the cavity thus produced as a continuation of the inside surface of the said vessel, a thermometer placed with its sensitive part within the said opening, the bulb of the said thermometer being broadened and pressed with its broad side against the said bottom plate, a good heat conductor consisting of a metallic powder surrounding the said bulb, a mantle attached to the said bottom plate for keeping the said powder in its position, a non-heat conductor of loose fibrous material surrounding the said mantle and the said powder therein, a box keeping the said fibrous material in position, means attached to the outer edge of the said opening for keeping the said box in its place, and means fixed to the wall of the said vessel for attaching the stem and scale of the said thermometer thereto.

3. In a machine of the kind herein described, the combination with the vessel in which the operation takes place, having a cavity provided in its wall, the thin bottom of the cavity following in shape the inside surface of the latter, of a thermometer arranged with its bulb in the said cavity and with its scale outside the same, elastic means for pressing the bulb of the said thermometer against the bottom of the said cavity, a mantle consisting of a good heat-conductor surrounding the said bulb, a non-conductor surrounding the aforesaid mantle, and elastic means attached to the wall of the said vessel and adapted to keep the scale and stem of the said thermometer in their proper position.

4. In a machine of the kind herein described, the combination with the vessel in which the operation takes place, having a cavity provided in its wall, the thin bottom of the cavity following in shape the inside surface of the latter, of a thermometer arranged with its bulb inside and its scale outside the said cavity, a good heat-conductor consisting of a metallic powder surrounding the bulb, a mantle of thin material fixed to the bottom of the said cavity and adapted to contain the bulb of the said thermometer and the said good conductor, a spring so fixed to the inside of the said mantle that it presses the bulb of the said thermometer against the bottom of the said cavity, a non-conductor surrounding the aforesaid mantle, and elastic means attached to the wall of the said vessel and adapted to keep the scale and stem of the said thermometer in their proper position.

5. In a machine of the kind herein described, the combination with the vessel in which the operation takes place, having a cavity provided in its wall, the thin bottom of the cavity following the shape of the inside surface of the latter, of a thermometer arranged with its bulb inside and with its scale outside the said cavity, the horizontal part of the stem of the said thermometer being connected to the bulb by its downward part and to the scale by its upward part, a good heat conductor consisting of a metallic powder, a mantle of thin material fixed to the bottom of the said cavity and adapted to contain the bulb of the said thermometer and the said good conductor, a non-conductor surrounding the aforesaid mantle, a box attached to the wall of the said vessel and arranged to keep the non-conductor in position, this box and the aforesaid mantle being provided with suitable openings for the horizontal part of the stem of the said thermometer to pass through, a pivoted clamp fixed to the wall of the said vessel and so arranged and adapted as to keep the scale of the thermometer always in its proper position, a bracket attached to the said wall and supporting by its horizontal piece the horizontal part of the stem of the said thermometer, a housing arranged at the end of the horizontal piece of the said bracket, a spring contained therein and pressing against the vertical part of the said stem connecting its horizontal part and the scale of the said thermometer, the said bracket, housing and spring being so arranged that the latter presses the bulb of the said thermometer against the bottom of the said cavity.

6. In a machine of the kind herein described, the combination with the vessel in which the operation takes place, and which is emptied by being tilted, having a cavity provided in its wall, the thin bottom of the cavity following in shape the inside surface of the latter, of a thermometer arranged with its bulb inside and with its scale outside the said cavity, elastic means for pressing the bulb of the said thermometer against the bottom of the said cavity, a mantle consisting of a good heat-conductor surrounding the said bulb, a non-conductor surrounding the aforesaid mantle, and means attached to the wall of the said vessel, supporting the scale of the thermometer in such a manner that it is inclined from the vertical in a direction opposite to that in which the said vessel is tilted when being emptied, in such a degree that the scale of the thermometer will remain always upright, so that the mercury contained in the bulb is prevented from entering into the upper part of the thermometer.

LOUIS CHARLES REESE.